US012346846B2

(12) United States Patent
Bakshi et al.

(10) Patent No.: US 12,346,846 B2
(45) Date of Patent: Jul. 1, 2025

(54) SYSTEM FOR IMPLEMENTING PARAMETRIC OPTIMIZATION ANALYSIS FOR RESOURCE SELECTION

(71) Applicant: BANK OF AMERICA CORPORATION, Charlotte, NC (US)

(72) Inventors: Sakshi Bakshi, New Delhi (IN); Amod Jha, Telangana (IN); Siva Kumar Paini, Telangana (IN); Ashlesha Mithra, Haryana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 306 days.

(21) Appl. No.: 17/887,563

(22) Filed: Aug. 15, 2022

(65) Prior Publication Data
US 2024/0054413 A1 Feb. 15, 2024

(51) Int. Cl.
*G06Q 10/063* (2023.01)
*G06F 40/40* (2020.01)

(52) U.S. Cl.
CPC .......... *G06Q 10/063* (2013.01); *G06F 40/40* (2020.01); *G06Q 2220/00* (2013.01)

(58) Field of Classification Search
CPC ... G06Q 10/063; G06Q 2220/00; G06F 40/40
See application file for complete search history.

(56) References Cited

U.S. PATENT DOCUMENTS

| 8,140,373 | B2 | 3/2012 | Aron |
| 8,413,134 | B2 | 4/2013 | Celli |
| 10,250,451 | B1 | 4/2019 | Moghe |
| 11,429,433 | B2 | 8/2022 | Ramamurthy |
| 2006/0069605 | A1 | 3/2006 | Hatoun |

(Continued)

FOREIGN PATENT DOCUMENTS

WO  WO-2022225464 A1 * 10/2022

OTHER PUBLICATIONS

Rutesic, S., Cetkovic, J., Lakic, S., Zivkovic, A., & Knezevic, M. (2020). Proposition of a model for selection of the hybrid contract implementation strategy for a pilot project of regular road maintenance in montenegro. Advances in Civil Engineering, 2020, 44980. (Year: 2020).*

*Primary Examiner* — William S Brockington, III
(74) *Attorney, Agent, or Firm* — Moore & Van Allen PLLC; Anup Iyer

(57) ABSTRACT

Systems, computer program products, and methods are described herein for implementing parametric optimization analysis for resource selection. The present invention is configured to determine a first set of requirements associated with a resource exchange agreement; identify one or more non-fungible tokens (NFTs) for one or more categories of past resource exchange agreements based on at least the first set of requirements; extract, from the one or more NFTs, one or more resource descriptors associated with one or more past resource exchange agreements in the one or more categories; predict, using a machine learning subsystem, an optimal resource valuation model for one or more resources that meet the first set of requirements using the one or more resource descriptors and the first set of requirements; and transmit control signals configured to cause a first end-point device to display the optimal resource valuation model.

20 Claims, 7 Drawing Sheets

(56) References Cited

U.S. PATENT DOCUMENTS

| | | |
|---|---|---|
| 2006/0229924 A1 | 10/2006 | Aron |
| 2009/0144186 A1* | 6/2009 | Debarre ................. G06Q 10/10 |
| | | 705/37 |
| 2011/0213686 A1 | 9/2011 | Ferris |
| 2011/0238458 A1 | 9/2011 | Purcell |
| 2011/0320233 A1 | 12/2011 | Arnette |
| 2013/0117157 A1 | 5/2013 | Iyoob |
| 2013/0275475 A1 | 10/2013 | Ahlborn |
| 2014/0164048 A1 | 6/2014 | Bourdaillet |
| 2014/0229607 A1 | 8/2014 | Jung |
| 2014/0278807 A1 | 9/2014 | Bohacek |
| 2014/0278808 A1 | 9/2014 | Iyoob |
| 2015/0227268 A1 | 8/2015 | Rathod |
| 2015/0268935 A1 | 9/2015 | Muntes |
| 2015/0370467 A1 | 12/2015 | Holmes-Higgin |
| 2016/0094483 A1 | 3/2016 | Johnston |
| 2016/0134558 A1 | 5/2016 | Steinder |
| 2020/0043060 A1* | 2/2020 | Fleischman ......... G06F 16/2455 |
| 2021/0073285 A1* | 3/2021 | Hunter .................. H04L 9/3263 |
| 2021/0366065 A1* | 11/2021 | Zhou .................... G06Q 50/188 |
| 2023/0142754 A1* | 5/2023 | Srivastava ............. G06Q 10/08 |
| | | 705/28 |

\* cited by examiner

SYSTEM FOR IMPLEMENTING PARAMETRIC OPTIMIZATION ANALYSIS FOR RESOURCE SELECTION

FIELD OF THE INVENTION

The present invention embraces a system for implementing parametric optimization analysis for resource selection.

BACKGROUND

While setting up requirements in a resource exchange agreement there is a scope to improve upon existing resource selection analysis. Therefore, there is a need for parametric optimization analysis for resource selection.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for implementing parametric optimization analysis for resource selection is presented. The system comprises: at least one non-transitory storage device; and at least one processor coupled to the at least one non-transitory storage device, wherein the at least one processor is configured to: determine a first set of requirements associated with a resource exchange agreement; identify one or more non-fungible tokens (NFTs) for one or more categories of past resource exchange agreements based on at least the first set of requirements; extract, from the one or more NFTs, one or more resource descriptors associated with one or more past resource exchange agreements in the one or more categories; predict, using a machine learning subsystem, an optimal resource valuation model for one or more resources that meet the first set of requirements using the one or more resource descriptors and the first set of requirements; and transmit control signals configured to cause a first end-point device to display the optimal resource valuation model.

In some embodiments, the at least one processor is further configured to: retrieve, from an internal database, one or more past resource exchange agreements; receive, from a second end-point device, the one or more categories; group the one or more past resource exchange agreements into the one or more categories; and generate, using an NFT generation engine, the one or more NFTs for the one or more categories.

In some embodiments, grouping the one or more past resource exchange agreements further comprises: initiating, using the machine learning subsystem, metadata extraction on the one or more past resource exchange agreements using a natural language processing algorithm; extracting one or more metadata associated with the one or more past resource exchange agreements; and grouping the one or more past resource exchange agreements into the one or more categories based on at least the one or more metadata.

In some embodiments, generating the one or more NFTs further comprises: recording, in one or more metadata layers associated with the one or more NFTs, the one or more resource descriptors associated with the one or more past resource exchange agreements.

In some embodiments, the first set of requirements comprises at least one or more static requirements and one or more dynamic requirements.

In some embodiments, the at least one processor is further configured to: extract, from one or more external sources, a first set of resources that meet a first portion of the one or more dynamic requirements.

In some embodiments, the at least one processor is further configured to: receive, from the first end-point device, a second set of resources that meet a second portion of the one or more dynamic requirements.

In another aspect, a computer program product for implementing parametric optimization analysis for resource selection is presented. The computer program product comprising a non-transitory computer-readable medium comprising code causing an apparatus to: determine a first set of requirements associated with a resource exchange agreement; identify one or more non-fungible tokens (NFTs) for one or more categories of past resource exchange agreements based on at least the first set of requirements; extract, from the one or more NFTs, one or more resource descriptors associated with one or more past resource exchange agreements in the one or more categories; predict, using a machine learning subsystem, an optimal resource valuation model for one or more resources that meet the first set of requirements using the one or more resource descriptors and the first set of requirements; and transmit control signals configured to cause a first end-point device to display the optimal resource valuation model.

In yet another aspect, a method for implementing parametric optimization analysis for resource selection is presented. The method comprises: determining a first set of requirements associated with a resource exchange agreement; identifying one or more non-fungible tokens (NFTs) for one or more categories of past resource exchange agreements based on at least the first set of requirements; extracting, from the one or more NFTs, one or more resource descriptors associated with one or more past resource exchange agreements in the one or more categories; predicting, using a machine learning subsystem, an optimal resource valuation model for one or more resources that meet the first set of requirements using the one or more resource descriptors and the first set of requirements; and transmitting control signals configured to cause a first end-point device to display the optimal resource valuation model.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
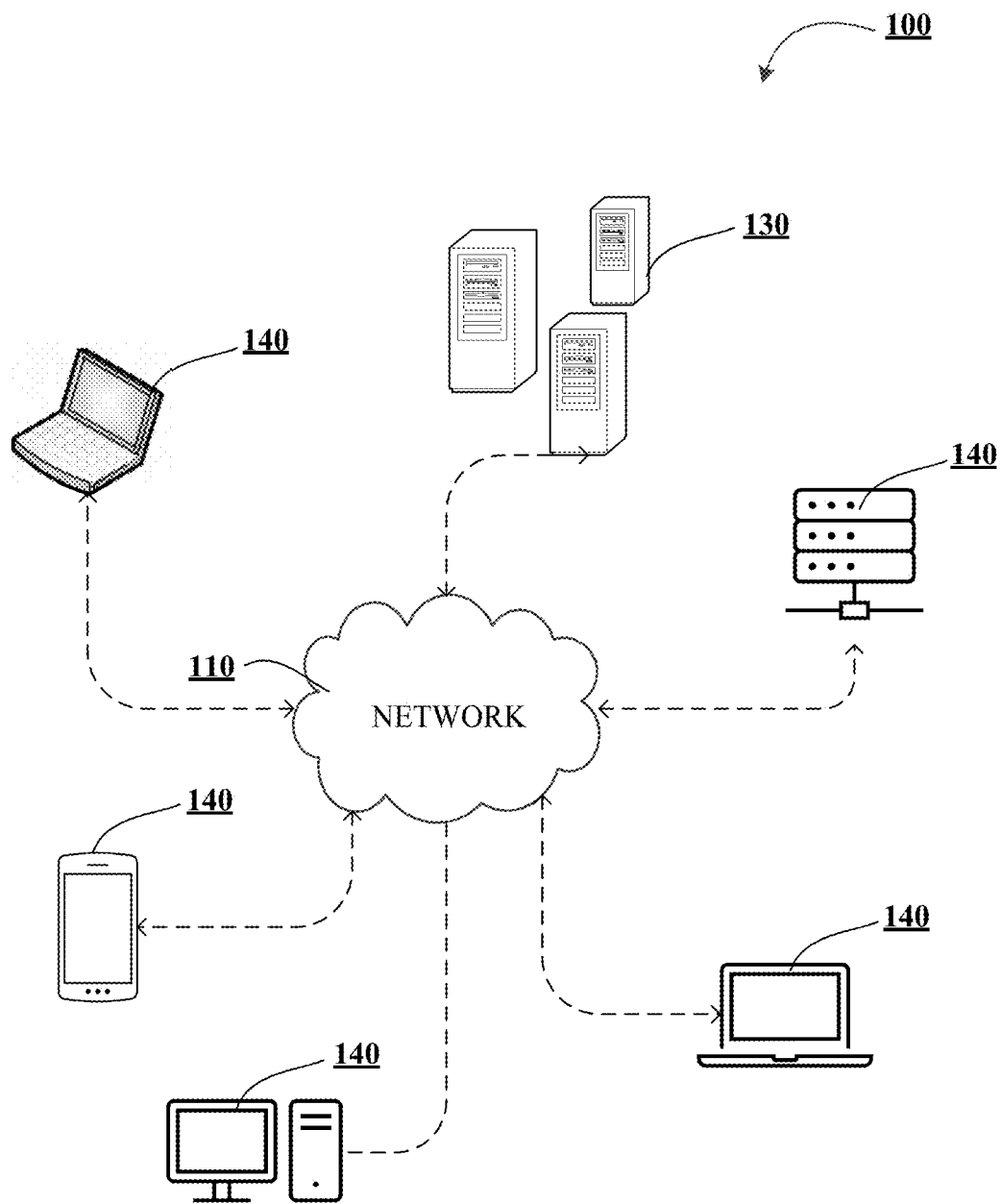
Figure 1B:
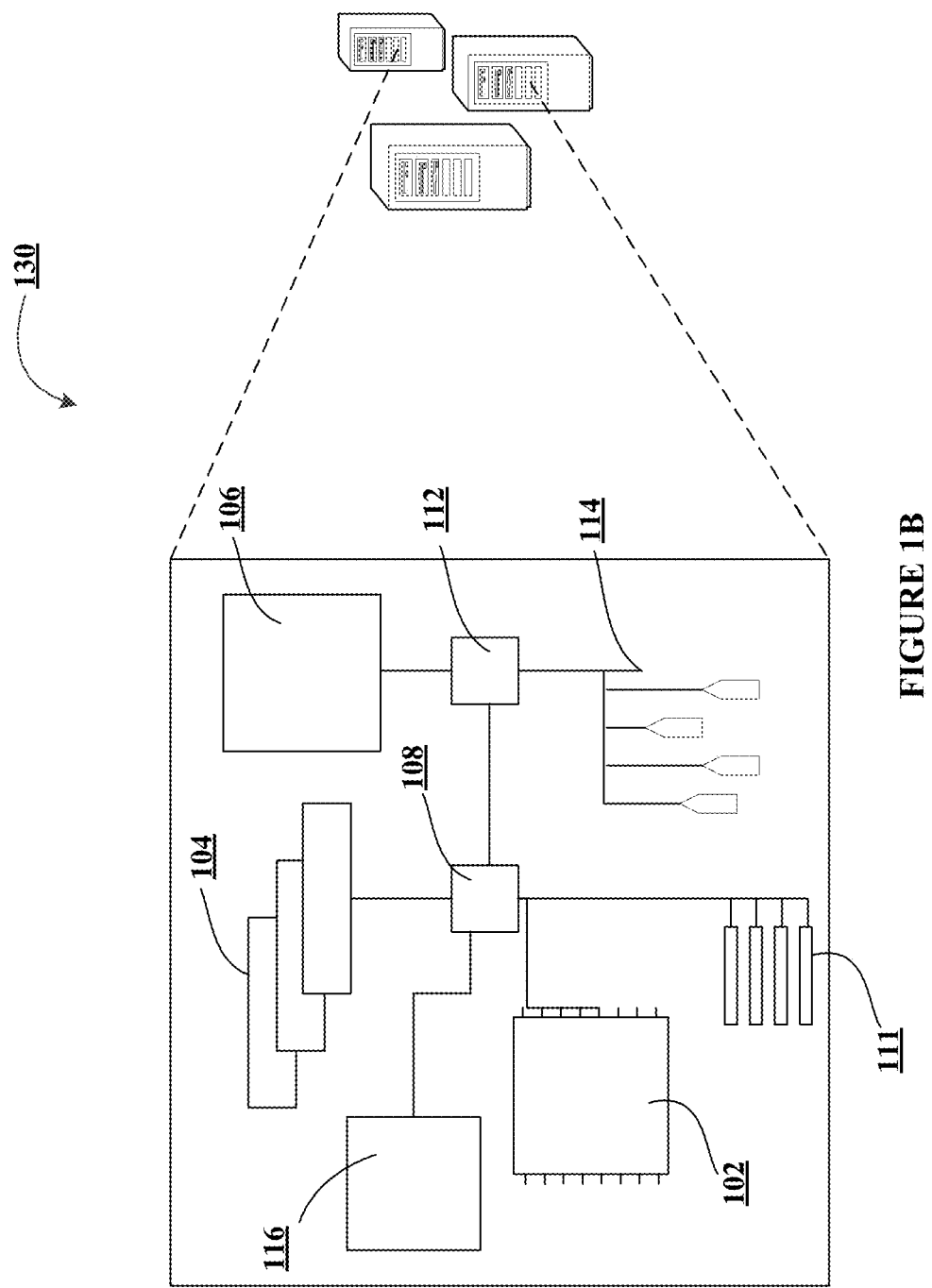
Figure 1C:
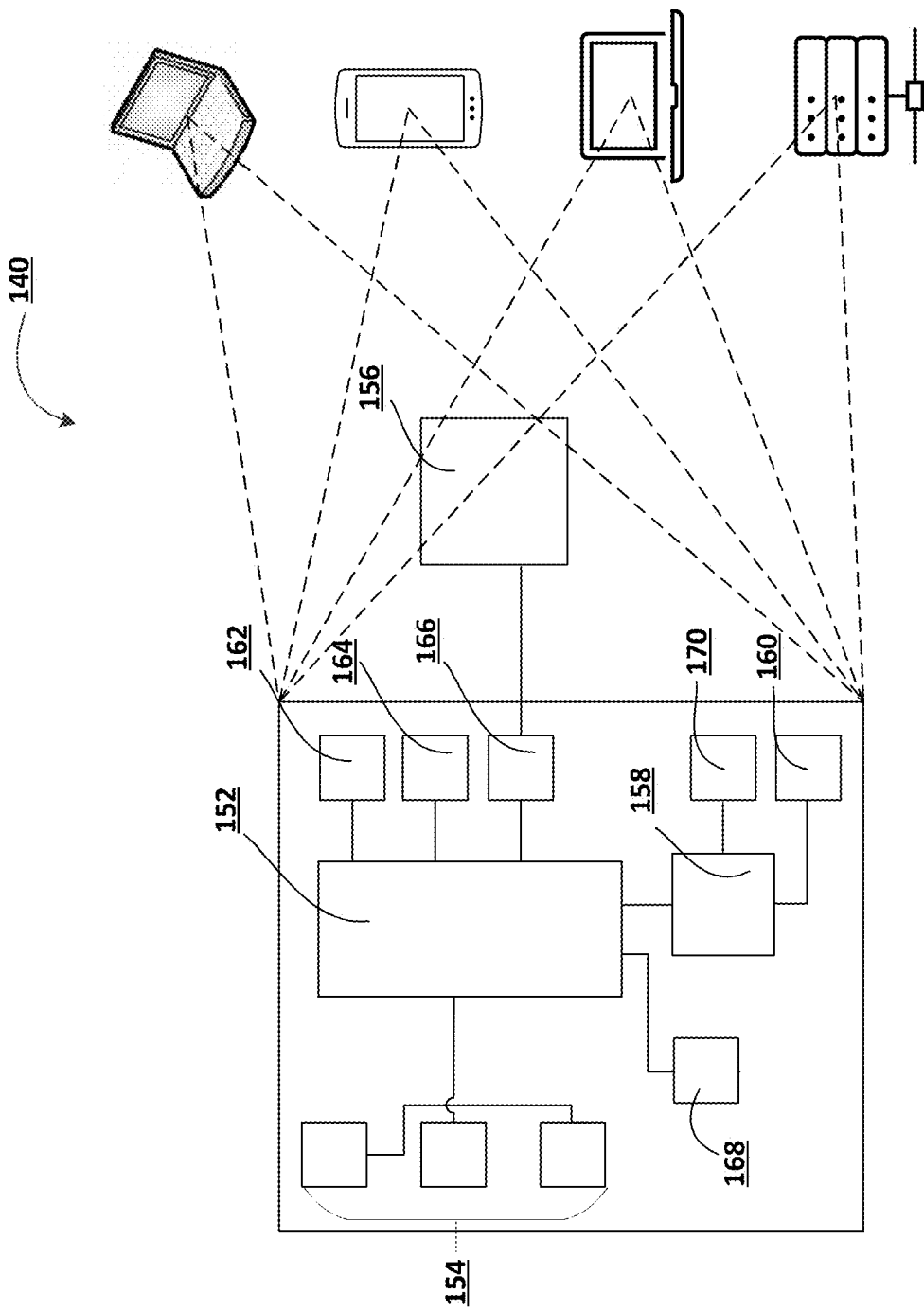
Figure 2A:
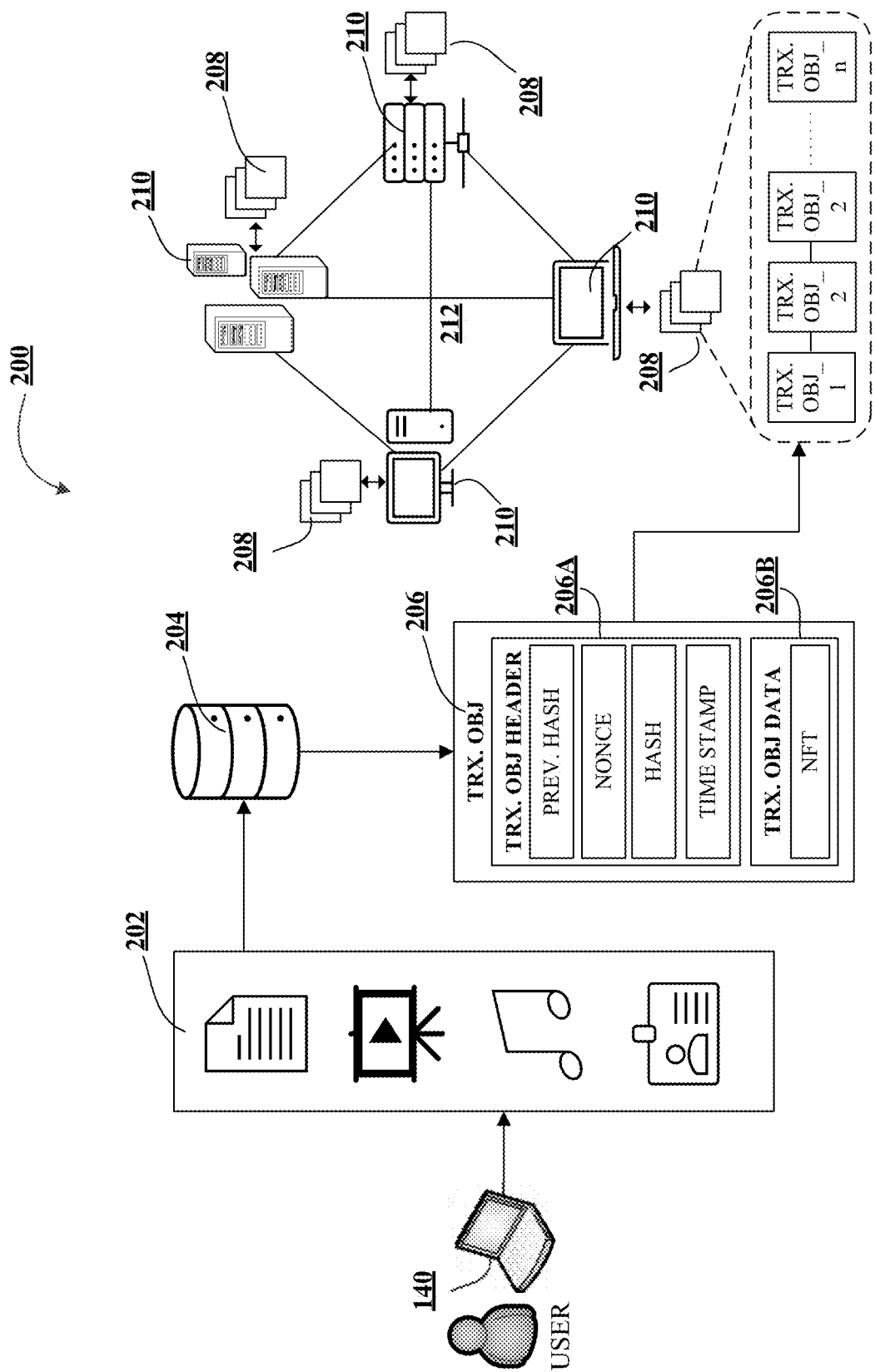
Figure 2B:
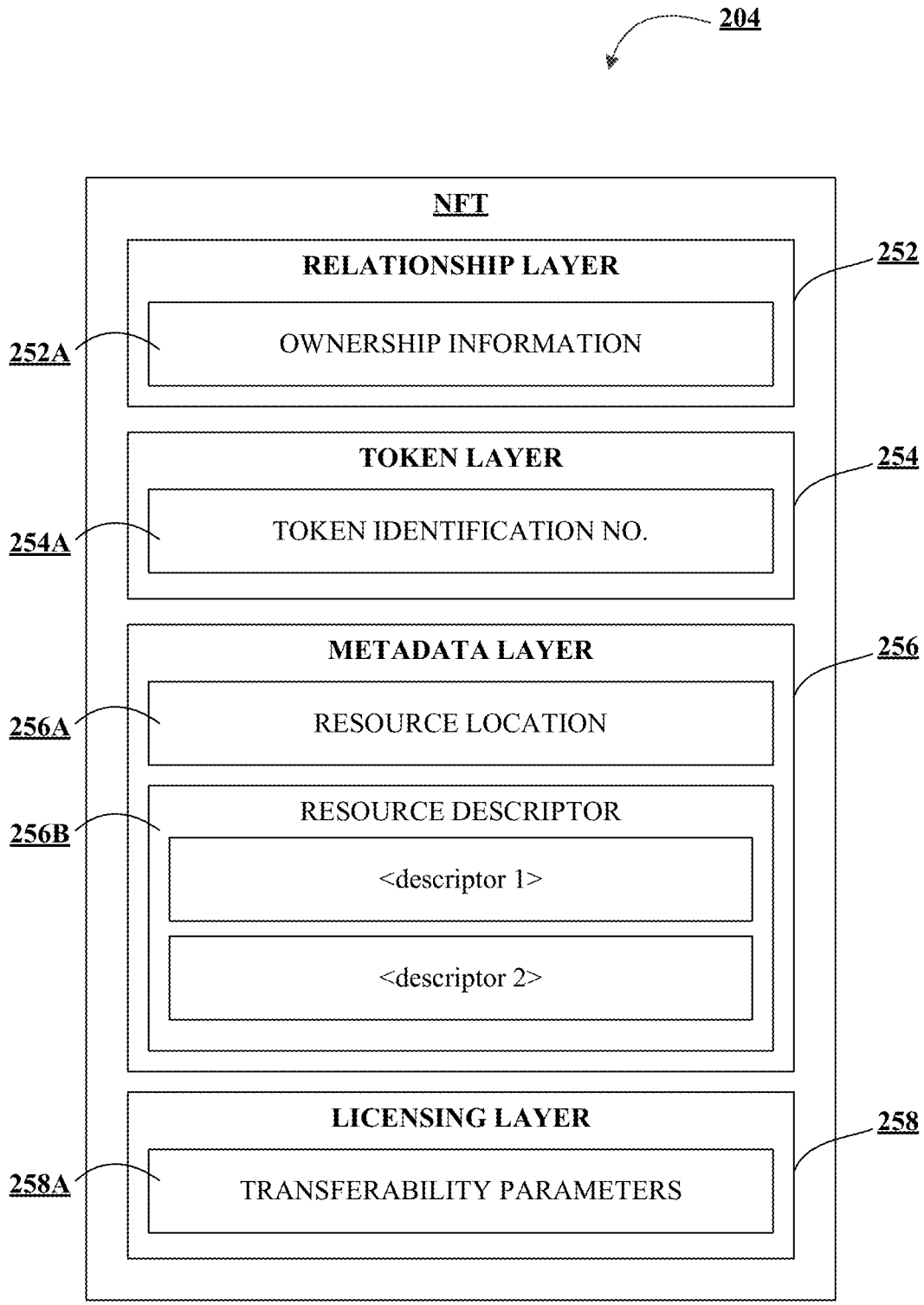
Figure 3:
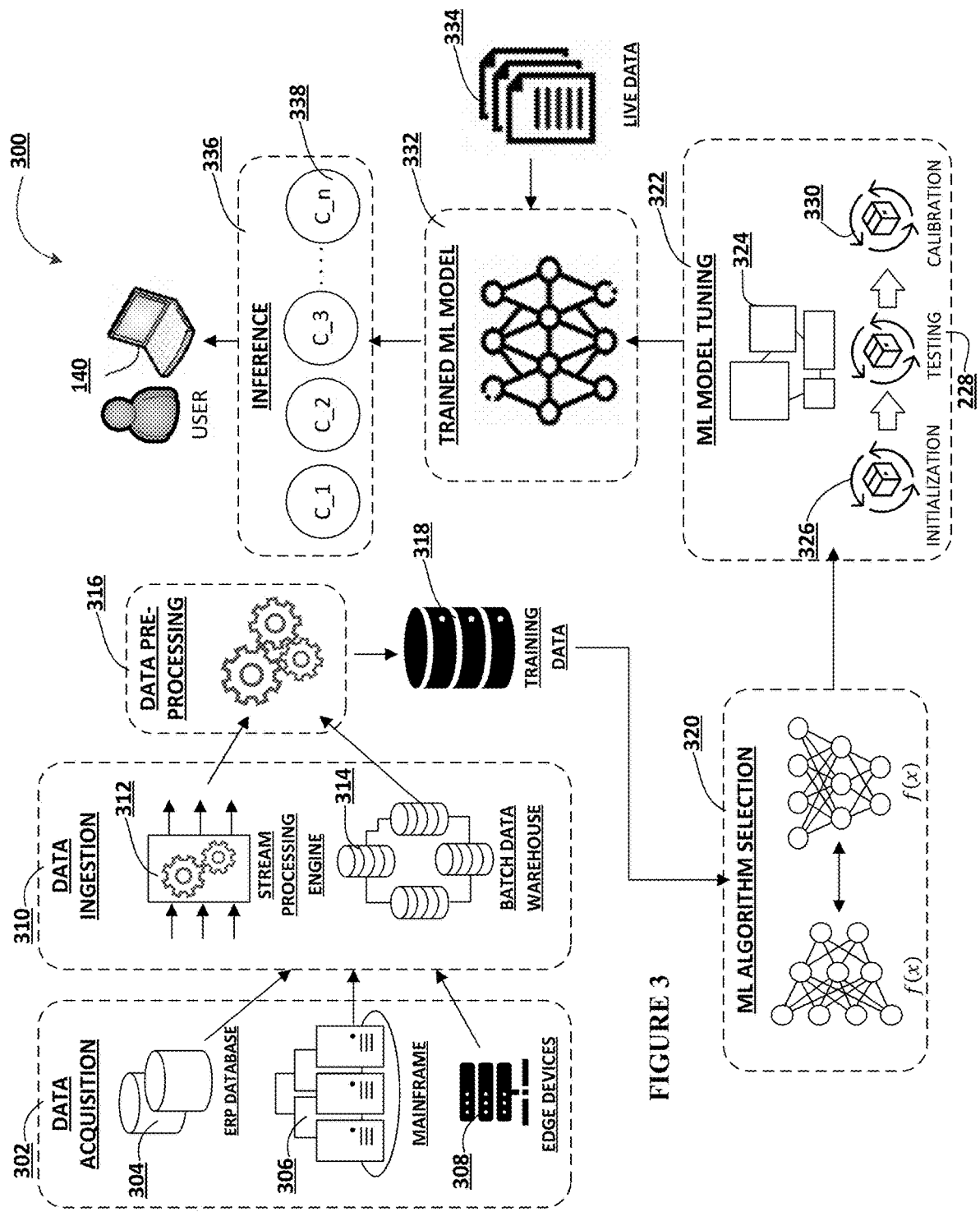
Figure 4:
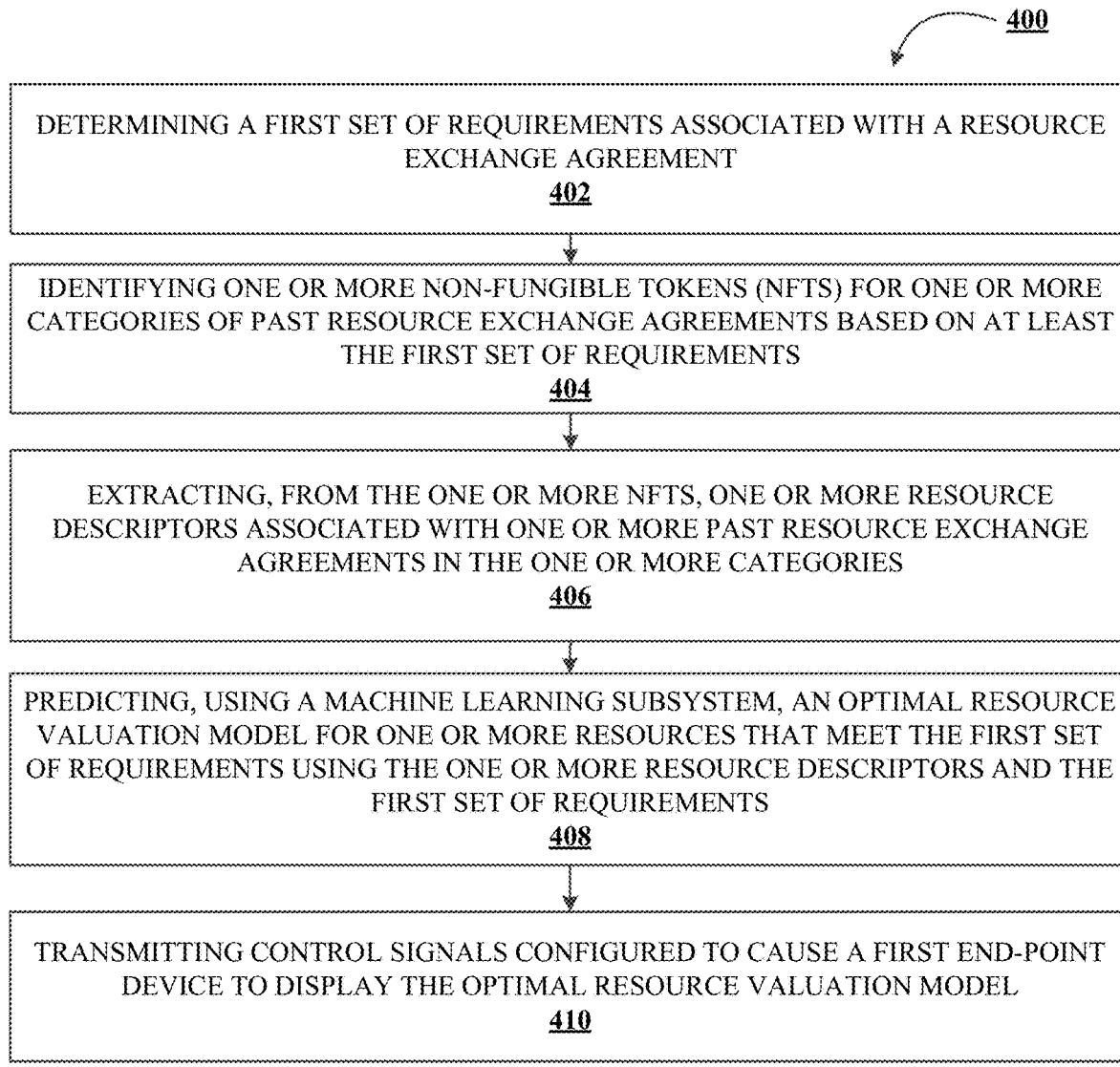

Having thus described embodiments of the invention in general terms, reference will now be made the accompanying drawings, wherein:

FIGS. 1A-1C illustrates technical components of an exemplary distributed computing environment for implementing parametric optimization analysis for resource selection, in accordance with an embodiment of the invention;

FIG. 2A illustrates an exemplary process of creating an NFT 200, in accordance with an embodiment of the invention;

FIG. 2B illustrates an exemplary NFT 204 as a multi-layered documentation of a resource, in accordance with an embodiment of an invention;

FIG. 3 illustrates an exemplary machine learning (ML) subsystem architecture 300, in accordance with an embodiment of the invention; and FIG. 4 illustrates a process flow for implementing parametric optimization analysis for resource selection, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same.

While setting up requirements in a resource exchange agreement there is a scope to involve a pricing structure in a resource valuation model (e.g., currency) which is acceptable to all parties involved. Requirements such as commodity or service required is also susceptible to change based on various factors and change in demand over the period of time of resource exchange agreement. During identification of sources and negotiations, all these factors have significant importance in decision making around fulfillment of requirements and requirement changes. Equally important factor becomes the resource valuation model in which the pricing structure is executed as changing exchange trends can lead to profit returns from one resource valuation model than a flat pricing from another. Due to changing market and exchange rates, implementing a regular valuation model may not be the most efficient. For the benefit of all parties involved, it is important to forecast the future trends to take deterministic decision using parametric optimization to predict the optimal resource valuation model.

Accordingly, the present invention provides the functional benefit of considering all the requirements of a resource exchange agreement, including source inputs to evaluate an optimal resource valuation model to execute the resource exchange agreement. Categorizing past resource exchange agreements and tokenizing the categories in the form of non-fungible tokens (NFTs) makes the resource exchange agreement hierarchy creation and analysis easier, tying agreements/sub-agreements to one another inheriting primary agreement metadata, and makes the process estimation faster with categorical indexing. Furthermore, this framework considers the real-time needs for futuristic evaluations to help in present decision making for resource valuation and service needs for any agreement. NFT based dynamic categorization makes the token search faster and more real-time as NFTs can accommodate multiple resource exchange agreements with inheritance properties to trace their hierarchy in defined tokens. Therefore, for any parameter search, token comparison becomes easier and faster to index the required category first and then to index the required resource exchange agreement in the category. Furthermore, the technical solution described herein uses a rigorous, computerized process to perform specific tasks and/or activities that were not previously performed. In specific implementations, the technical solution bypasses a series of steps previously implemented, thus further conserving computing resources.

Accordingly, the present invention, (i) Determines a first set of requirements associated with a resource exchange agreement (contract). Resource exchange agreements may include a number of requirements that need fulfillment, such products or services involved, service conditions, vendor names, pricing structure, and/or the like. Each requirement defined by a procuring party may be met by a resource offered by a vendor party, (ii) Identifies one or more non-fungible tokens (NFTs) for categories of past resource exchange agreements based on at least the first set of requirements. Past resource exchange agreements are digitized and organized based on user-defined categories. The resource exchange agreement categorizer subsystem to scan the resource exchange agreement and extract metadata therefrom. Metadata may include requirements associated with the past resource exchange agreements, information associated with resources that meet the requirements of the past resource exchange agreements, information associated with purchase orders (POs), invoices, sub-agreements, purchase history, and any other transactional information related to the resource exchange agreement, and/or the like. The resource exchange categorizer subsystem may be configured to group past resource exchange agreements based on their metadata similarities. Each category containing a number of related past resource agreements are then tokenized using an NFT generation engine. The NFT ecosystem may link the past resource exchange agreements to each other to form resource exchange agreement hierarchy where they are categorized based on user input, (iii) Extracts, from the one or more NFTs, resource descriptors, i.e., metadata, associated with one or more past resource exchange agreements in the one or more categories, (iv) Predicts, using a machine learning subsystem, an optimal resource valuation model (currency) for the resources that meet the first set of requirements using the resource descriptors and the first set of requirements. The optimal resource valuation model may include a number of dynamic variables that are capable of being modified in real-time based on external data to direct the resource exchange agreement to operate within the desired rails of the resource valuation model. For example, the resource valuation model may include the selection of an optimal currency for operation of the resource exchange agreement such that the parties involved can maximize their monetary gain from participating in the resource exchange agreement.

FIGS. 1A-1C illustrate technical components of an exemplary distributed computing environment for implementing parametric optimization analysis for resource selection 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

An NFT is a cryptographic record (referred to as "tokens") linked to a resource. An NFT is typically stored on a distributed ledger that certifies ownership and authenticity of the resource, and exchangeable in a peer-to-peer network.

FIG. 2A illustrates an exemplary process of creating an NFT 200, in accordance with an embodiment of the invention. As shown in FIG. 2A, to create or "mint" an NFT, a user (e.g., NFT owner) may identify, using a user input device 140, resources 202 that the user wishes to mint as an NFT. Typically, NFTs are minted from digital objects that represent both tangible and intangible objects. These resources 202 may include a resource exchange agreement (e.g., contract), a piece of art, music, collectible, virtual world items, videos, real-world items such as artwork and real estate, or any other presumed valuable object. These resources 202 are then digitized into a proper format to produce an NFT 204. In embodiments where the digital object is a past resource exchange agreement, digitizing into a proper format may include implementing machine learning techniques such as natural language processing (NLP) algorithms to extract metadata associated with the past resource exchange agreement. The NFT 204 may be a multi-layered documentation that identifies the resources 202 but also evidences various transaction conditions associated therewith, as described in more detail with respect to FIG. 2A.

To record the NFT in a distributed ledger, a transaction object 206 for the NFT 204 is created. The transaction object 206 may include a transaction header 206A and a transaction object data 206B. The transaction header 206A may include a cryptographic hash of the previous transaction object, a nonce—a randomly generated 32-bit whole number when the transaction object is created, cryptographic hash of the current transaction object wedded to the nonce, and a time stamp. The transaction object data 206B may include the NFT 204 being recorded. Once the transaction object 206 is generated, the NFT 204 is considered signed and forever tied to its nonce and hash. The transaction object 206 is then deployed in the distributed ledger 208. At this time, a distributed ledger address is generated for the transaction object 206, i.e., an indication of where it is located on the distributed ledger 208 and captured for recording purposes. Once deployed, the NFT 204 is linked permanently to its hash and the distributed ledger 208, and is considered recorded in the distributed ledger 208, thus concluding the minting process As shown in FIG. 2A, the distributed ledger 208 may be maintained on multiple devices (nodes) 210 that are authorized to keep track of the distributed ledger 208. For example, these nodes 210 may be computing devices such as system 130 and end-point device(s) 140. One node 210 may have a complete or partial copy of the entire distributed ledger 208 or set of transactions and/or transaction objects on the distributed ledger 208. Transactions, such as the creation and recordation of a NFT, are initiated at a node and communicated to the various nodes. Any of the nodes can validate a transaction, record the transaction to its copy of the distributed ledger, and/or broadcast the transaction, its validation (in the form of a transaction object) and/or other data to other nodes.

FIG. 2B illustrates an exemplary NFT 204 as a multi-layered documentation of a resource, in accordance with an embodiment of an invention. As shown in FIG. 2B, the NFT may include at least relationship layer 252, a token layer 254, a metadata layer 256, and a licensing layer 258. The relationship layer 252 may include ownership information 252A, including a map of various users that are associated with the resource and/or the NFT 204, and their relationship to one another. For example, if the NFT 204 is for a resource exchange agreement between a buyer B1 and a vendor V1, the relationship between B1 and V1 as a buyer-vendor is recorded in the relationship layer 252. In another example, if the NFT 204 is owned by O1 and the resource itself is stored in a storage facility by storage provider SP1, then the relationship between O1 and SP1 as owner-file storage provider is recorded in the relationship layer 252. The token layer 254 may include a token identification number 254A that is used to identify the NFT 204. The metadata layer 256 may include at least a file location 256A and a file descriptor 256B. The file location 256A may provide information associated with the specific location of the resource 202. Depending on the conditions listed in the smart contract underlying the distributed ledger 208, the resource 202 may be stored on-chain, i.e., directly on the distributed ledger 208 along with the NFT 204, or off-chain, i.e., in an external storage location. The file location 256A identifies where the resource 202 is stored. The file descriptor 256B may include specific information associated with the resource itself 202. For example, if the NFT 204 is a for a past resource exchange agreement, the file descriptor 256B may include the metadata extracted from the past resource exchange agreement, such as about the product involved, service term, service conditions, vendor information, pricing structure, vendor and/or buyer requirements associated with the resource exchange agreement, and/or the like. The licensing layer 258 may include any transferability parameters 258B associated with the NFT 204, such as restrictions and licensing rules associated with purchase, sale, and any other types of transfer of the resource 202 and/or the NFT 204 from one person to another. Those skilled in the art will appreciate that various additional layers and combinations of layers can be configured as needed without departing from the scope and spirit of the invention.

FIG. 3 illustrates an exemplary machine learning (ML) subsystem architecture 300, in accordance with an embodiment of the invention. The machine learning subsystem 300 may include a data acquisition engine 302, data ingestion engine 310, data pre-processing engine 316, ML model tuning engine 322, and inference engine 336.

The data acquisition engine 302 may identify various internal and/or external data sources to generate, test, and/or integrate new features for training the machine learning model 324. These internal and/or external data sources 304, 306, and 308 may be initial locations where the data originates or where physical information is first digitized. The data acquisition engine 302 may identify the location of the data and describe connection characteristics for access and retrieval of data. In some embodiments, data is transported from each data source 304, 306, or 308 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the data sources 304, 306, and 308 may include one or more NFTs associated with past resource exchange agreements, and in particular, the resource descriptors in the metadata layers of the NFTs associated with the past resource exchange agreements, Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 302 from these data sources 304, 306, and 308 may then be transported to the data ingestion engine 310 for further processing.

Depending on the nature of the data imported from the data acquisition engine 302, the data ingestion engine 310 may move the data to a destination for storage or further analysis. Typically, the data imported from the data acquisition engine 302 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 302, the data may be ingested in real-time, using the stream processing engine 312, in batches using the batch data warehouse 314, or a combination of both. The stream processing engine 312 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 314 collects and transfers data in batches according to scheduled intervals, trigger events, or any other logical ordering.

In machine learning, the quality of data and the useful information that can be derived therefrom directly affects the ability of the machine learning model 324 to learn. The data pre-processing engine 316 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 316 may implement feature extraction and/or selection techniques to generate training data 318. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 318 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 322 may be used to train a machine learning model 324 using the training data 318 to make predictions or decisions without explicitly being programmed to do so. The machine learning model 324 represents what was learned by the selected machine learning algorithm 320 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 322 may repeatedly execute cycles of experimentation 326, testing 328, and tuning 330 to optimize the performance of the machine learning algorithm 320 and refine the results in preparation for deployment of those results for consumption or decision making. To this end, the ML model tuning engine 322 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 318. A fully trained machine learning model 332 is one whose hyperparameters are tuned and model accuracy maximized.

The trained machine learning model 332, similar to any other software application output, can be persisted to storage, file, memory, or application, or looped back into the processing component to be reprocessed. More often, the trained machine learning model 332 is deployed into an existing production environment to make practical business decisions based on live data 334. To this end, the machine learning subsystem 300 uses the inference engine 336 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 338) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 338) live data 334 based on how similar they are to one another to solve exploratory challenges where little is known about the data, provide a description or label (e.g., $C\_1, C\_2 \ldots C\_n$ 338) to live data 334, such as in classification, and/or the like. These categorized outputs, groups (clusters), or labels are then presented to the user input system 130. In still other cases, machine learning models that perform regression techniques may use live data 334 to predict or forecast continuous outcomes.

It will be understood that the embodiment of the machine learning subsystem 300 illustrated in FIG. 3 is exemplary and that other embodiments may vary. As another example, in some embodiments, the machine learning subsystem 300 may include more, fewer, or different components.

While setting up requirements in a resource exchange agreement there is a scope to involve a pricing structure in a resource valuation model (e.g., currency) which is acceptable to all parties involved. Requirements such as commodity or service required is also susceptible to change based on various factors and change in demand over the period of time of resource exchange agreement. During identification of sources and negotiations, all these factors have significant importance in decision making around fulfillment of requirements and requirement changes. Equally important factor becomes the resource valuation model in which the pricing structure is executed as changing exchange trends can lead to profit returns from one resource valuation model than a flat pricing from another.

FIG. 4 illustrates a process flow for implementing parametric optimization analysis for resource selection 400, in accordance with an embodiment of the invention. As shown in block 402, the process flow includes determining a first set of requirements associated with a resource exchange agreement. In some embodiments, a resource exchange agreement may be structured tradeoff between multiple parties to have a transfer of resources that meet specific requirements (e.g., first set of requirements). Resource exchange agreements may include a number of requirements that need fulfillment, such products or services involved, service conditions, pricing structure, and/or the like. Each requirement defined by a procuring party may be met by a resource offered by a vendor party.

In some embodiments, the requirements may be static requirements. In one aspect, static requirements are those requirements whose fulfillment does not depend on continuously changing market factors such as speculation and expectation, supply and demand, and/or the like. For example, static requirements may include a volume of product, types of services required, procurement term, vendor type, and/or the like. In one aspect, the resources (e.g., first set of the resources) for static requirements may be received from the user. In some other embodiments, the requirements may be dynamic requirements. In one aspect, dynamic requirements are those requirements whose fulfillment depend on continuously changing market factors such as speculation and expectation, and supply and demand. For example, dynamic requirements may include exchange rate, market trends, service indexes and/or the like. In one aspect, the resources (e.g., second set of resources) for dynamic requirements may be received from external sources, such as stock exchange platforms, pricing platforms, and/or the like.

Next, as shown in block 404, the process flow includes identifying one or more non-fungible tokens (NFTs) for one or more categories of past resource exchange agreements based on at least the first set of requirements. In some embodiments, past resource exchange agreements are digitized and organized based on user-defined categories. In this regard, the system may be configured to receive, from an end-point device (e.g., second end-point device), categories for grouping. As resource exchange agreements are executed, the system may be configured to initiate the resource exchange agreement categorizer subsystem to scan the resource exchange agreement and extract metadata therefrom. In some embodiments, the metadata may include requirements associated with the past resource exchange agreements, information associated with resources that meet the requirements of the past resource exchange agreements, information associated with purchase orders (POs), invoices, sub-agreements, purchase history, and any other transactional information related to the resource exchange agreement, and/or the like. As part of the metadata extraction, the resource exchange agreement categorizer subsystem may be configured to extract metadata from the resource exchange agreement using natural language processing (NLP) techniques in accordance with ERC-1155 protocol compliance for agreement tokenization. Similar to the metadata extracted from the resource exchange agreement, the metadata extracted from other sources are also done in accordance with ERC-1155 protocol compliance for agreement tokenization.

In response to extracting the metadata, the resource exchange categorizer subsystem may be configured to group past resource exchange agreements based on their metadata similarities. For example, past resource exchanges related to the same product in question are categorized into a product-category, past resource exchanges related to the same vendor/sub-vendor are categorized into a vendor-category, past resource exchanges related to similar service terms are categorized into service-category, and/or the like. Each category containing a number of related past resource agreements are then tokenized. In this regard, the system may be configured to generate, using an NFT generation engine, an NFT for each category. In doing so, the NFT ecosystem may link the past resource exchange agreements to each other to form resource exchange agreement hierarchy where they are categorized based on user input. Such categorization allows for ease of access and analysis on resource exchange agreements and increases overall system efficiency and maintaining the integrity of each contract. As described herein, the resource descriptors in the metadata layer of the NFT may include metadata extracted from the past resource agreements. In some embodiments, the resource descriptors in the metadata layer of the NFT may include only metadata that is common across the past resource exchange agreements that are used in the categorization process. For example, the NFT for a group of past resource exchange agreements based on a product-category may include, as resource descriptors, information associated with the products (e.g., product type, product amount, product pricing, and/or the like) in each past resource exchange agreement.

Next, as shown in block 406, the process flow includes extracting, from the one or more NFTs, one or more resource descriptors associated with one or more past resource exchange agreements in the one or more categories. As described herein, the resource descriptors may include metadata associated with the past resource exchange agreements, and in some cases only metadata that is common across the past resource exchange agreements that are used in the categorization process.

Next, as shown in block 408, the process flow includes predicting, using a machine learning subsystem, an optimal resource valuation model for one or more resources that meet the first set of requirements using the one or more resource descriptors and the first set of requirements. In some embodiments, the optimal resource valuation model may include a number of dynamic variables that are capable of being modified in real-time based on external data to direct the resource exchange agreement to operate within the desired rails of the resource valuation model. In one aspect, the values of the dynamic variables may affect the outcome of how the resources meet the first set of requirements. For example, the resource valuation model may include the selection of an optimal currency for operation of the resource exchange agreement such that the parties involved can maximize their monetary gain from participating in the resource exchange agreement.

The machine learning subsystem may be configured to initiate a machine learning model on the resource descriptors associated with past resource exchange agreements and the first set of requirements. As described herein, the machine learning subsystem may be configured to train the machine learning model. To train the machine learning model, the machine learning subsystem may be configured to generate training data using the resource descriptors associated with past resource exchange agreements. In particular, the training data may include the requirements associated with the past resource exchange agreements, information associated with resources that met the requirements associated with the past resource change agreements, and valuation models used to execute the past resource exchange agreements. The machine learning model is then trained using the training dataset. Once trained, the machine learning model may be used to process the first set of requirements, i.e., requirements associated with the resource exchange agreement, to predict the optimal resource valuation model.

Next, as shown in block 410, the process flow includes transmitting control signals configured to cause a first endpoint device to display the optimal resource valuation model. In some embodiments, in response to determining the optimal resource valuation model, the system may be configured to automatically execute the resource exchange agreement.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, a computer-implemented process is thus produced, such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for implementing parametric optimization analysis for resource selection, the system comprising:
   at least one non-transitory storage device; and
   at least one processor coupled to the at least one non-transitory storage device,
   wherein the at least one processor is configured to:
   determine a first set of requirements associated with a resource exchange agreement;
   identify one or more non-fungible tokens (NFTs) for one or more categories of past resource exchange agreements based on at least the first set of requirements, wherein the one or more NFTs are stored on a distributed ledger, wherein each NFT comprises a cryptographic hash that links the past resource exchange agreements and metadata associated with the past resource exchange agreements that are stored in a hierarchical data structure, wherein the metadata associated with the past resource exchange agreements is structured according to ERC-1155 tokenization protocol for categorical indexing;
   extract, from the one or more NFTs, one or more resource descriptors associated with one or more past resource exchange agreements in the one or more categories;
   predict, using a machine learning subsystem, an optimal resource valuation model for one or more resources that meet the first set of requirements using the one or more resource descriptors and the first set of requirements, wherein predicting further causes the at least one processor to:
   train a machine learning model using a feature selection process that extracts relevant features from the one or more resource descriptors associated with the one or more past resource exchange agreements, information associated with resources that met requirements associated with the one or more past resource exchange agreements, and valuation models used to execute the one or more past resource exchange agreements, wherein training the machine learning model further comprises using regression, clustering, or neural network-based models; and
   predict, using the trained machine learning model, the optimal resource valuation model;
   transmit control signals configured to cause a first end-point device to display the optimal resource valuation model; and
   automatically execute the resource exchange agreement by deploying a smart contract on the distributed ledger, wherein the smart contract comprises predefined execution conditions based on the optimal resource valuation model, wherein the smart contract is cryptographically verified using hash-based transaction validation.

2. The system of claim 1, wherein the at least one processor is further configured to:
   retrieve, from an internal database, the past resource exchange agreements;
   receive, from a second end-point device, the one or more categories;
   group the past resource exchange agreements into the one or more categories; and
   generate, using an NFT generation engine, the one or more NFTs for the one or more categories.

3. The system of claim 2, wherein grouping the past resource exchange agreements further comprises:
   initiating, using the machine learning subsystem, metadata extraction on the past resource exchange agreements using a natural language processing algorithm;
   extracting one or more metadata associated with the past resource exchange agreements; and
   grouping the past resource exchange agreements into the one or more categories based on at least the one or more metadata.

4. The system of claim 2, wherein generating the one or more NFTs further comprises:

recording, in one or more metadata layers associated with the one or more NFTs, the one or more resource descriptors associated with the past resource exchange agreements.

5. The system of claim 1, wherein the first set of requirements comprises at least one or more static requirements and one or more dynamic requirements.

6. The system of claim 5, wherein the at least one processor is further configured to:
  extract, from one or more external sources, a first set of resources that meet a first portion of the one or more dynamic requirements.

7. The system of claim 5, wherein the at least one processor is further configured to:
  receive, from the first end-point device, a second set of resources that meet a second portion of the one or more dynamic requirements.

8. A computer program product for implementing parametric optimization analysis for resource selection, the computer program product comprising a non-transitory computer-readable medium comprising code causing an apparatus to:
  determine a first set of requirements associated with a resource exchange agreement;
  identify one or more non-fungible tokens (NFTs) for one or more categories of past resource exchange agreements based on at least the first set of requirements, wherein the one or more NFTs are stored on a distributed ledger, wherein each NFT comprises a cryptographic hash that links the past resource exchange agreements and metadata associated with the past resource exchange agreements that are stored in a hierarchical data structure, wherein the metadata associated with the past resource exchange agreements is structured according to ERC-1155 tokenization protocol for categorical indexing;
  extract, from the one or more NFTs, one or more resource descriptors associated with past resource exchange agreements in the one or more categories;
  predict, using a machine learning subsystem, an optimal resource valuation model for one or more resources that meet the first set of requirements using the one or more resource descriptors and the first set of requirements, wherein predicting further causes the apparatus to:
    train a machine learning model using a feature selection process that extracts relevant features from the one or more resource descriptors associated with the past resource exchange agreements, information associated with resources that met requirements associated with the past resource exchange agreements, and valuation models used to execute the past resource exchange agreements, wherein training the machine learning model further comprises using regression, clustering, or neural network-based models; and
    predict, using the trained machine learning model, the optimal resource valuation model;
  transmit control signals configured to cause a first end-point device to display the optimal resource valuation model; and
  automatically execute the resource exchange agreement by deploying a smart contract on the distributed ledger, wherein the smart contract comprises predefined execution conditions based on the optimal resource valuation model, wherein the smart contract is cryptographically verified using hash-based transaction validation.

9. The computer program product of claim 8, wherein the apparatus is further configured to:
  retrieve, from an internal database, the past resource exchange agreements;
  receive, from a second end-point device, the one or more categories;
  group the past resource exchange agreements into the one or more categories; and
  generate, using an NFT generation engine, the one or more NFTs for the one or more categories.

10. The computer program product of claim 9, wherein grouping the past resource exchange agreements further comprises:
  initiating, using the machine learning subsystem, metadata extraction on the past resource exchange agreements using a natural language processing algorithm;
  extracting one or more metadata associated with the past resource exchange agreements; and
  grouping the past resource exchange agreements into the one or more categories based on at least the one or more metadata.

11. The computer program product of claim 9, wherein generating the one or more NFTs further comprises:
  recording, in one or more metadata layers associated with the one or more NFTs, the one or more resource descriptors associated with the past resource exchange agreements.

12. The computer program product of claim 8, wherein the first set of requirements comprises at least one or more static requirements and one or more dynamic requirements.

13. The computer program product of claim 12, wherein the apparatus is further configured to:
  extract, from one or more external sources, a first set of resources that meet a first portion of the one or more dynamic requirements.

14. The computer program product of claim 12, wherein the apparatus is further configured to:
  receive, from the first end-point device, a second set of resources that meet a second portion of the one or more dynamic requirements.

15. A method for implementing parametric optimization analysis for resource selection, the method comprising:
  determining a first set of requirements associated with a resource exchange agreement;
  identifying one or more non-fungible tokens (NFTs) for one or more categories of past resource exchange agreements based on at least the first set of requirements, wherein the one or more NFTs are stored on a distributed ledger, wherein each NFT comprises a cryptographic hash that links the past resource exchange agreements and metadata associated with the past resource exchange agreements that are stored in a hierarchical data structure, wherein the metadata associated with the past resource exchange agreements is structured according to ERC-1155 tokenization protocol for categorical indexing;
  extracting, from the one or more NFTs, one or more resource descriptors associated with past resource exchange agreements in the one or more categories;
  predicting, using a machine learning subsystem, an optimal resource valuation model for one or more resources that meet the first set of requirements using the one or more resource descriptors and the first set of requirements, wherein predicting further comprises:
    training a machine learning model using a feature selection process that extracts relevant features from the one or more resource descriptors associated with the past resource exchange agreements, information associated with resources that met requirements associated with the past resource exchange agreements, and valuation models used to execute the past resource exchange agreements, wherein training the machine learning model further comprises using regression, clustering, or neural network-based models; and predicting, using the trained machine learning model, the optimal resource valuation model;

transmitting control signals configured to cause a first end-point device to display the optimal resource valuation model; and automatically executing the resource exchange agreement by deploying a smart contract on the distributed ledger, wherein the smart contract comprises predefined execution conditions based on the optimal resource valuation model, wherein the smart contract is cryptographically verified using hash-based transaction validation.

16. The method of claim 15, wherein the method further comprises:

retrieving, from an internal database, the past resource exchange agreements;

receiving, from a second end-point device, the one or more categories;

grouping the past resource exchange agreements into the one or more categories; and generating, using an NFT generation engine, the one or more NFTs for the one or more categories.

17. The method of claim 16, wherein grouping the past resource exchange agreements further comprises:

initiating, using the machine learning subsystem, metadata extraction on the past resource exchange agreements using a natural language processing algorithm;

extracting one or more metadata associated with the past resource exchange agreements; and grouping the past resource exchange agreements into the one or more categories based on at least the one or more metadata.

18. The method of claim 16, wherein generating the one or more NFTs further comprises:

recording, in one or more metadata layers associated with the one or more NFTs, the one or more resource descriptors associated with the past resource exchange agreements.

19. The method of claim 15, wherein the first set of requirements comprises at least one or more static requirements and one or more dynamic requirements.

20. The method of claim 19, wherein the method further comprises:

extracting, from one or more external sources, a first set of resources that meet a first portion of the one or more dynamic requirements.

* * * * *